United States Patent [19]

Rossi et al.

[11] Patent Number: 4,644,040

[45] Date of Patent: Feb. 17, 1987

[54] HIGH TEMPERATURE STABLE ACRYLIC ADHESIVE COMPOSITIONS EMPLOYING AROMATIC POLYIMIDE AND POLYISOIMIDE BIS-ACETYLENE ADDITIVES

[75] Inventors: Robert D. Rossi, Levittown, Pa.; Dilip K. Ray-Chaudhuri, Bridgewater, N.J.

[73] Assignee: National Starch and Chemical Corporation, Bridgewater, N.J.

[21] Appl. No.: 847,810

[22] Filed: Apr. 3, 1986

Related U.S. Application Data

[60] Continuation-in-part of Ser. No. 732,987, May 13, 1985, abandoned, which is a division of Ser. No. 574,448, Jan. 27, 1984, Pat. No. 4,532,270.

[51] Int. Cl.$^4$ .......................... C08F 22/40; C08F 38/00
[52] U.S. Cl. ..................................... 525/426; 526/259; 156/331.5
[58] Field of Search ...................... 523/176; 526/259; 525/426; 524/854, 72 D; 156/331.5

[56] References Cited

U.S. PATENT DOCUMENTS

| | | | |
|---|---|---|---|
| 3,845,018 | 10/1974 | Bilow | 260/47 |
| 3,879,349 | 4/1975 | Bilow | 260/47 |
| 3,988,299 | 10/1976 | Malofsky | 526/258 |
| 4,098,767 | 7/1978 | Bilow | 525/426 |
| 4,100,138 | 7/1978 | Bilow | 525/426 |
| 4,316,974 | 2/1982 | Ohmura | 525/426 |
| 4,365,034 | 12/1982 | Grimes | 526/259 |
| 4,381,363 | 4/1983 | Reinhart | 526/259 |
| 4,404,139 | 9/1983 | D'Alelio | 525/426 |
| 4,405,770 | 9/1983 | Schoenberg | 526/259 |
| 4,431,792 | 2/1984 | St. Clair | 525/428 |
| 4,532,270 | 7/1985 | Rossi | 523/176 |

Primary Examiner—C. Warren Ivy
Attorney, Agent, or Firm—Lori D. Tolly; Edwin M. Szala

[57] ABSTRACT

Novel acrylic adhesive compositions are prepared comprising an acrylic or substituted acrylic monomer and a normal poyimide or polyisomide bis-acetylene additive.

7 Claims, No Drawings

HIGH TEMPERATURE STABLE ACRYLIC ADHESIVE COMPOSITIONS EMPLOYING AROMATIC POLYIMIDE AND POLYISOIMIDE BIS-ACETYLENE ADDITIVES

This application is a continuation-in-part of Ser. No. 732,987 filed May 13, 1985, now abandoned, which is a divisional of Ser. No. 574,448 filed Jan. 27, 1984, now U.S. Pat. No. 4,532,270.

BACKGROUND OF THE INVENTION

This invention relates to adhesive and sealant compositions which exhibit improved strength properties at elevated temperatures as well as improved resistance to thermal degradation.

Adhesive and sealant compositions based on acrylic and substituted acrylic polymerizable monomers are known in the art. Anaerobic compositions employing such monomers are also well known. See, for instance, U.S. Pat. No. 2,895,950 issued on July 21, 1959 to V. Krieble. While useful in many applications where a strong adhesive bond is required, both standard as well as anaerobic acrylic adhesive compositions have been limited in applicability due to the degradative effect prolonged exposure to elevated temperatures greater than about 250° F. have on adhesive strength. U.S. Pat. No. 3,988,299 issued on Oct. 26, 1976 to B. Malofsky describes the increased resistance of diacrylate adhesives to high temperature degradation when maleimide compounds are employed in anaerobic adhesive compositions.

There is a need in the adhesives art for other additives which provide adhesive compositions with improved resistance to thermal degradation as well as improved strength properties at elevated temperatures.

SUMMARY

According to the present invention, by employing an additive from a specific class of bis-acetylene compounds, an adhesive and sealant composition may be prepared which exhibits improved resistance to thermal degradation.

The adhesive composition comprises a mixture of an acrylic or substituted acrylic monomer and a normal polyimide or polyisoimide bis-acetylene additive have the formula:

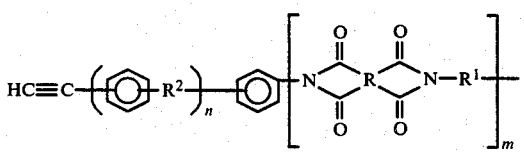

a.

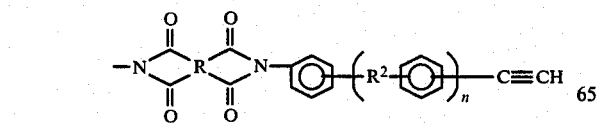

wherein R is

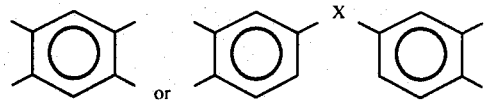

with X being O, CH$_2$, S, CO, SO$_2$, CHOH, —(CF$_2$)$_p$—, —CF$_2$—O—CF$_2$—, —C(CF$_3$)$_2$—, or a bond; R$^1$ is

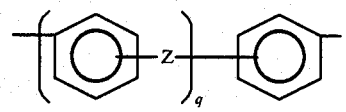

with Z being O, CH$_2$, S, CO, SO$_2$, CHOH, —(CF$_2$)$_p$—, —CF$_2$—O—CF$_2$—, —C(CF$_3$)$_2$—; and q being 0-5;
R$^2$ is O, CH$_2$, S, CO, SO$_2$, —(CF$_2$)$_p$—, —CF$_2$—O—CF$_2$—, —C(CF$_3$)$_2$—; with p being 1-5;
n is 0 to 10; and
m is 0 or above and preferably 0 to 100; or

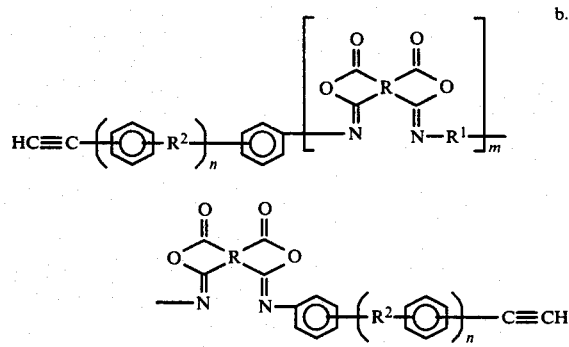

b.

wherein R, R$^1$, R$^2$, n, and m have the meanings given above.

This invention further relates to a process for sealing or adhering surfaces comprising applying the composition of this invention to surfaces to be sealed or adhered.

DESCRIPTION OF THE PREFERRED EMBODIMENTS

One class of polymerizable acrylic monomers useful in the present compositions corresponds to the general formula:

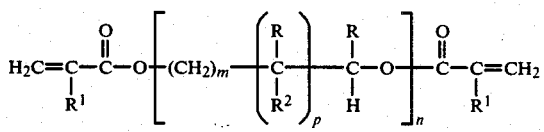

where R is selected from the group consisting of hydrogen, methyl, ethyl

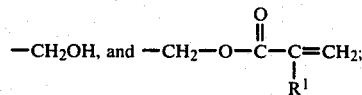

R$^1$ is selected from the group consisting of hydrogen, chlorine, methyl and ethyl;

$R^2$ is selected from the group consisting of hydrogen, hydroxy, and

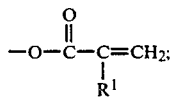

m is an integer equal to at least 1, e.g., from 1 to 8 or higher and preferably from 1 to 4 inclusive;

n is an integer equal to at least 1, e.g., from 1 to 20 or more; and p is 0 or 1.

Monomers useful herein and which come within the above general formula include, for example, ethylene glycol dimethacrylate, ethylene glycol diacrylate, polyethylene glycol diacrylate, tetraethylene glycol dimethylacrylate, diglycerol diacrylate, diethylene glycol dimethacrylate, pentaerythritol triacrylate, and other polyether diacrylates and dimethacrylates.

A second class of acrylic monomers useful herein are the mono- and polyacrylate and methacrylate esters of bisphenol type compounds. These monomers may be described by the following formula:

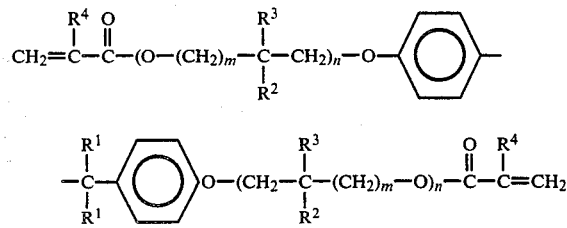

wherein $R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl;
n is an integer having a value of 0 to 8; and
m is 0 or 1.

Representative monomers of the above-described class include: dimethacrylate and diacrylate esters of 4,4'bishydroxyethoxy-bisphenol A and dimethacrylate and diacrylate esters of bisphenol A. These monomers are described in Japanese Pat. Publication No. 70-15,640 of K. Orite, M. Natsume, and N. Shimada in 1970.

In the production of the adhesive compositions herein small amounts (i.e., less than about 10% based on the total weight of the composition) of optional polymerizable monomers may be employed. Examples of suitable monomers include hydroxyethyl (meth)acrylate, hydroxypropyl (meth)acrylate, methyl methacrylate, diacetone acrylamide, 2-cyanoethyl acrylate, 2-chloroethyl acrylate, 2-hydroxy-3-chloropropyl methacrylate, propargyl methacrylate, (meth)acrylic acid, itaconic acid, citraconic acid, maleic acid, and the like.

It is to be understood that the various monomers useful herein are not required to be in a highly purified state. The monomers may be comprised of commercial grades in which inhibitors, stabilizers, or other additives or impurities may be present, as well as those prepared in the laboratory or on a pilot plant scale.

Methods for preparing the bis-acetylene additives useful in the present invention are known in the art. U.S. Pat. Nos. 3,845,018 and 3,879,349 issued on Oct. 29, 1974 and Apr. 22, 1975, respectively to N. Bilow et al.; 4,097,456 issued on June 27, 1978 to W. Barie, Jr.; and 4,405,770 issued on Sept. 20, 1983 to J. Schoenberg describe the preparation of acetylene substituted polyimide oligomers. See also Hergenrother, P. M., "Acetylene-terminated Imide Oligomers and Polymers Therefrom", Polymer Preprints, Am. Chem. Soc., Vol. 21 (#1), pgs. 81–83 (March 1980). European Patent Application No. 71,372 published on Feb. 9, 1983 to A. Landis describes the preparation of acetylene substituted polyisoimide oligomers.

The oligomers are generally prepared by a reaction sequence which proceeds by first reacting a diamine with a stoichiometric excess of an aromatic tetracarboxylic acid, a lower alkyl ester thereof including the diesters-diacids and tetraesters or preferably a dianhydride in the presence of a sufficient amount of a solvent such as dimethylformamide, dimethylacetamide, or N-methyl-2-pyrrolidone. The resultant anhydride-capped polyamic acid or the corresponding acid- or ester capped analog intermediate is then reacted with an aminoaryleneacetylene. After the reaction has been completed the product is in the polyamic acid form which can then be cyclized by thermal or chemical dehydration to form the acetylene terminated polyimides.

Thermal dehydration of the polyamic acid intermediate with the azeotropic removal of water results in the production of a normal polyimide species.

Chemical dehydration, on the other hand, employing such dehydrating agents as trifluoracetic anhydride, acetic anhydride, or N,N'-dicyclohexylcarbodiimide at relatively low temperatures produces substantial amounts of the isoimide species. The polyisoimide structurally shown as "b" above has all potential sites where either an isoimide or imide group could form arbitrarily shown in the isoimide form. It should be recognized by those skilled in the art that in the chemical dehydration of amic acids, there is a tendency for imide groups to be formed and interspersed randomly with the isoimide groups of the oligomer. Therefore it is understood that after chemical dehydration of polyamic acids the formation of both the corresponding isoimide and/or isoimideimide containing oligomers may be present. The isoimide is also structurally shown as being in the cis isomer form. For the purposes of this invention, either the cis or trans isomers of the isoimide oligomers are useful herein.

Aromatic tetracarboxylic acids, esters or dianhydrides which have not been polymerized with diamines may be reacted with aminoaryleneacetylenes then cyclized to produce additives which are also useful herein. Preferred additives include those prepared with either pyromellitic dianhydride of benzophenone tetracarboxylic dianhydride and aminophenylacetylene.

In particular N,N'-bis(ethynylphenyl)-1,2,4,5-benzenetetracarboxylic diimide, no previously described in the literature, was found to be a very effective additive herein. Anaerobic adhesives containing this additive possessed superior shear strength after heat curing as well as heat stability after aging. The tetracarboxylic dianhydrides useful in the preparation of the bis-acetylene additives herein may have the formula:

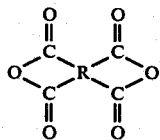

wherein R is

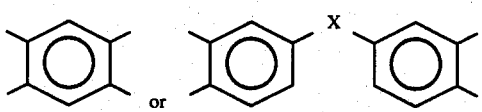

While the nature of R is not critical, R should not contain any group which would adversely affect the composition for purposes disclosed herein. For example, we have found that naphthenic or other ladder-type groups are not applicable in the preparation of the adhesive additive due to their lack of flexibility and/or solubility in the cured adhesive system. Most commonly X is selected from the group consisting of CO, $CH_2$, O, S, or a bond. The use of pyromellitic dianhydride or benzophenone tetracarboxylic dianhydride (BTDA) are preferred.

The diamines useful herein have the formula $H_2N-R^1-NH_2$ wherein $R^1$ is

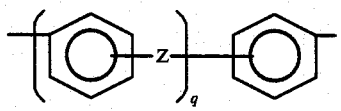

and Z and q are as previously defined. The $R^1$ group may bear one or more groups selected from the group of chlorine, methyl, phenyl, or ethynyl. The use of 1,3-bis(3-aminophenoxy)benzene is preferred.

The aminoarylacetylenes useful herein have the formula:

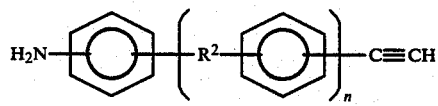

wherein $R^2$ and n are as previously defined. The use of meta-aminophenylacetylene (APA) is preferred. Meta substitution of the acetylene group relative to the amino or R group is preferred in that the resulting angle of the polyimide will not be perfectly linear, as some asymmetry will be introduced into the molecular structure.

The aminoarylacetylenes useful herein may be prepared in a number of ways. See for example, Prepr. Div. Pet. Chem. Am. Chem. Soc., Vol. 24, (#1), 233 (1979) which describes the preparation of APA. U.S. Pat. Nos. 4,128,588 and 4,204,078 issued on Dec. 5, 1978 and May 20, 1980 respectively to E. Sabourin et al. describe improved methods for preparing nitrophenylacetylene, a precursor for APA. U.S. Pat. No. 3,928,450 issued on Dec. 23, 1975 to N. Bilow et al. describes the preparation of aminoarylacetylenes wherein the aryl group is phenoxy phenylene or phenylene thiophenylene.

In general the adhesive compositions which employ the polyimide or polyisoimide bis-acetylene additives herein are readily cured by application of moderate heat. Suitable cure temperatures, which may be easily determined by those skilled in the art, will vary depending on the rate of cure desired as well as the ceiling temperature of the acrylic monomers employed in the adhesive.

The useful concentration range for the polyimide or polyisoimide additives is about 1 to about 50, preferably 15 to 40, and most preferably 20 to 30 percent by weight of the total composition.

In order to improve the storage stability of the composition, it is preferable, but not necessary, that the composition contain a stabilizer such as an inhibitor of free radical polymerization. Suitable inhibitors include those conventionally employed, such as hydroquinones, benzoquinone, naphthoquinone, p-t-butyl catechol, phenothiazine, sterically hindered phenols, etc. The amount of inhibitor employed depends, for example, on the type of monomer used. Generally, it ranges from 0.0001 to 0.1% by weight, based on monomer, preferably 0.0025 to 0.05%. While the monomer will normally be obtained with a certain amount of inhibitor present therein, additional inhibitor may be added as necessary at any time to bring the amount up to the required level.

The presence of a chelating agent (chelator) is also preferable, but not necessary, and it provides the compositions herein with better stability. The chelator is defined, herein, as a compound capable of complexing with a metal atom through coordination bonds betwen the metal and ligand atoms of the chelator to form a heterocyclic ring. Although many chelating agents are suitable, the preferred chelators are oxalic acid and those compounds having a combination of oxygen and nitrogen ligand atoms such as hydroxyquinoline and the β-aminocarboxylates such as tetrasodium ethylenediamine tetracetic acid ($Na_4EDTA$). In general, the chelator useful herein should preferably be soluble in the monomer. The amount of the chelator employed depends mainly on the type of chelator, but also to a minor extent on the amounts and types of other ingredients in the composition. Amounts from about 0.0001% to about 0.1% by weight of the total composition may be employed depending upon the particular chelator added. It is noted that with certain chelators, the amount thereof must not exceed about 0.01% by weight to obtain an adhesive having good properties. When these chelators are added in amounts above this limit, the bond strength of the adhesive decreases dramatically. The practitioner will readily discover which chelators may be added in which amounts to best advantage. The lower limit of chelator is determined by the minimum stability desired in the composition. Preferred amounts of chelator range from 0.001 to 0.02% by weight.

Various other additives known to the skilled practitioner may also be incorporated in the compositions such as thickeners, plasticizers, inert fillers, etc., provided they do not deleteriously effect the additive for its intended purpose.

The polyimide and polyisoimide bis-acetylene additives herein, when employed in the adhesive compositions, provide adhesives which at elevated temperatures possess improved resistance to degradation as well as greater adhesive bond strength.

The following examples will further describe and illustrate the practice of this invention but they are not intended to limit it scope. In these examples the compositions were prepared by mixing the indicated ingredients in amounts given as parts by weight unless otherwise specified.

EXAMPLE 1

Preparation of N,N'-Bis(3-ethynylphenyl)-1,2,4,5-benzenetetracarboxylic diimide

*[Structure I: HC≡C-phenyl-N(CO)₂-benzene-(CO)₂N-phenyl-C≡CH]*

To a 500 ml multi-necked round bottom flask, equipped with mechanical stirrer, reflux condensor, thermometer and Dean-Stark trap and maintained under a positive pressure of nitrogen was added 30 g. (0.26 mole) of 3-aminophenylacetylene (APA) and 125 ml of dry N,N-dimethylacetamide (DMA). A total of 32.2 g. (0.13 mole at 85%) of pyromellitic dianhydride was added at such a rate as to maintain the temperature of the mixture below 50° C. The mixture was then stirred for 1 hour at room temperature. Seventy (70) ml of toluene was added to the flask and the mixture was heated to azeotropic distillation (85°-100° C.) to remove the water of imidization. After no more water was produced (10 hours) the reaction solution was cooled to room temperature and 100 ml of cold toluene was added. The diimide (I) which precipitated was filtered, washed with cold toluene and then dried in an air circulating oven at 95° C. overnight to yield 48.2 g (0.12 mole, 89% theoretical).

Analysis for $C_{26}H_{12}N_2O_4$ (M.W.=417.21): Calculated: %C, 74.85; %H, 3.09; %N, 6.71. Found %C, 73.36; %H, 3.24; %N, 7.04.

IR (KBr pellet) analysis: 3280 cm$^{-1}$ (—C≡CH), 1780 and 1725 cm$^{-1}$ (imide C=O).

EXAMPLE 2

Preparation of N,N'-Bis(3-ethynylphenyl)benzophenone tetracarboxylic diimide

*[Structure II: HC≡C-phenyl-N(CO)₂-benzene-CO-benzene-(CO)₂N-phenyl-C≡CH]*

The diimide was prepared as in Example 1 employing 30 g APA, 155 ml DMA, and 42 g (0.13 mole) of benzophenone tetracarboxylic dianhydride (BTDA). The diimide (II) was recovered as in Example 1 yielding 57 g (0.11 mole, 85% theoretical). Diimide II had a melting point of 330° C. IR (KBr) analysis: 3260 cm$^{-1}$ (—C≡CH), 1780 and 1725 cm$^{-1}$ (imide C=O).

EXAMPLE 3 (Comparative)

Preparation of N,N'-Diallylbenzophenone tetracarboxylic diimide

*[Structure III: CH₂=CHCH₂-N(CO)₂-benzene-CO-benzene-(CO)₂N-CH₂CH=CH₂]*

The diimide was prepared as in Example 2 employing 30.0 g (0.525 mole) of allylamine instead of APA, 350 ml DMA, 83.72 g (0.26 mole) BTDA, and 325 ml toluene. The diimide III was recovered by precipitation in water to yield 91 g (0.23 mole, 87% theoretical).

EXAMPLE 4

Adhesive compositions were prepared comprising the following basic formulation:

|  | CONTROL | TEST |
|---|---|---|
| Ethoxylated bis-phenol A dimethacrylate | 95.5% | 70.5% |
| Ortho-sulfobenzimide | 2.5% | 2.5% |
| Styrene methyl methacrylate copolymer | 2.0% | 2.0% |
| Additive | 0 | 25.0% |
| Hydroquinone | 25 ppm | 25 ppm |
| (Na₄EDTA) | 100 ppm | 100 ppm |

The following additives were employed:

| SAMPLE | ADDITIVE |
|---|---|
| A | N,N'—bis (3-ethynylphenyl)benzophenone tetracarboxylic diimide (II) |
| B - Comparative | 1,1'-(Methylene di-4,1-phenylene) bis-maleimide° |
| C - Comparative | N,N'—diallylbenzophenone tetracarboxylic diimide (III) |

°Bis-maleimide as described in U.S. Pat. No. 3,988,299.

Each test adhesive formulation was prepared by the following procedure:

A 100 ml high density polyethylene vessel was charged with 35.2 parts ethoxylated bis-phenol A dimethacrylate, 12.5 parts additive, 1.25 parts saccharin and 0.00125 parts hydroquinone. With stirring the mixture was heated to 65°-70° C. before 0.005 parts of ethylenediamine tetracetic acid (5% in methanol) was added. The mixture was maintained at 65°-70° C. for 6-7 hours and then cooled to room temperature.

EXAMPLE 5

The adhesive formulations prepared in Example 4 were stored at room temperature for about 20 hours then applied to black oxide nuts and bolts. The samples were cured at 450° F. then aged thereafter for two weeks. At approximately 1 and 2 weeks, five test samples were cooled to room temperature then evaluated for "break/prevail" strength measured with a torque wrench in inch-pounds. The break strength measures the force necessary to initially break the bond between the nut and bolt. The prevail strength is determined by unwinding the nut from the bolt 360 degrees from the break point and averaging the force measured after each 90 degree turn. The averaged results are found in Table I.

TABLE I

| Sample | Days at 450° F. | | | |
|---|---|---|---|---|
| | 6 | 7 | 12 | 14 |
| Control + no additive | — | 205/175 | — | 125/166 |
| Control + A | — | 330/193 | — | 355/146 |
| Control + B | 120/101 | — | 38/16.5 | — |
| Control + C | 115/257 | — | 46/67.25 | — |

The results show that incorporation of the bis-acetylene polyimide additive provided the acrylic adhesive with improved adhesive bond strength as well as improved resistance to prolonged elevated temperature exposure. Conversely, it was shown that the comparative bis-maleimide and diallyl diimide additives had a degradative effect on acrylic adhesive bond strength and temperature resistance.

EXAMPLE 6

An acrylic adhesive formulation is prepared as in Example 4 with 12.5 parts of diimide I of Example 1. The adhesive is applied to black oxide nuts and bolts and then cured as in Example 5. Similar improvements in bond strength and heat stability are expected over a control adhesive which does not contain the diimide additive.

EXAMPLE 7

An acrylic adhesive formulation is prepared and applied as in Example 6 employing Thermid ® MC-600, a bis-acetylene polyimide obtained from National Starch and Chemical Corporation having formula "a", described above, wherein m is 1, n is 0, R is

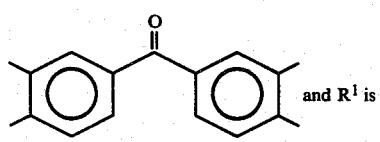

and $R^1$ is

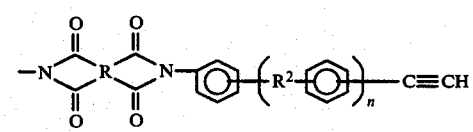

Similar improvements in bond strength and heat stability are expected over a control adhesive which does not contain the polyimide additive.

We claim:

1. An adhesive composition curable by application of heat comprising a nonanaerobic mixture of (A) an acrylic or substituted acrylic monomer selected from the group consisting of:

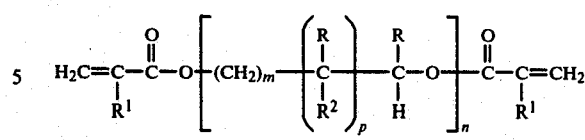

where R is selected from the group consisting of hydrogen, methyl, ethyl

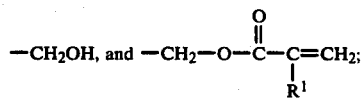

$R^1$ is selected from the group consisting of hydrogen, chlorine, methyl and ethyl;

$R^2$ is selected from the group consisting of hydrogen, hydroxy, and

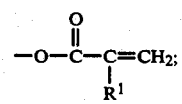

m is an integer from 1 to 8;
n is an integer from 1 to 20;
p is 0 or 1;

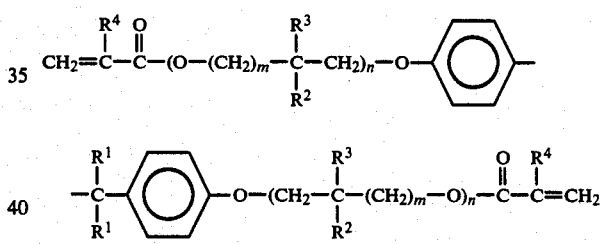

wherein
$R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl;
n is an integer having a value of 0 to 8; and
m is 0 or 1;
and mixtures thereof; and (B) about 1 to 50% by weight of the total composition of an additive selected from the group consisting of a polyimide having a structure

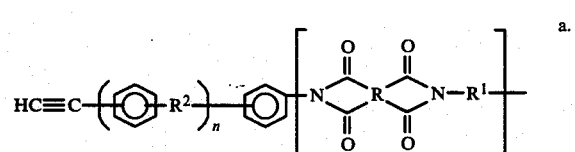

a polyisoimide having a structure b.

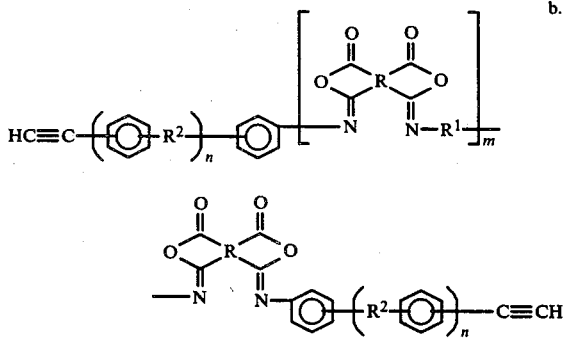

and mixtures thereof;
wherein R is

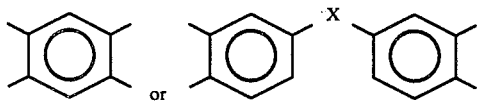

with X being O, CH$_2$, S, CO, SO$_2$, CHOH, —(CF$_2$)$_p$—, —CF$_2$—O—CF$_2$—, —C(CF$_3$)$_2$—, or a bond;
R$^1$ is

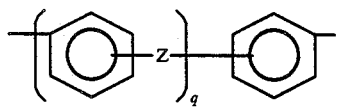

with Z being O, CH$_2$, S, CO, SO$_2$, CHOH, —(CF$_2$)$_p$—, —CF$_2$—O—CF$_2$—, —C(CF$_3$)$_2$—;
and q being 0–5;

R$^2$ is O, CH$_2$, S, CO, SO$_2$, —(CF$_2$)$_p$—, —CF$_2$—O—CF$_2$—, —C(CF$_3$)$_2$—; with
p being 1–5;
n is 0 to 10; and
m is 0 or above.

2. The composition of claim 1, wherein the monomer is ethoxylated bisphenol A dimethacrylate or triethylene glycol dimethacrylate.

3. The composition of claim 2, wherein the monomer is ethoxylated bisphenol A dimethacrylate.

4. The composition of claim 1, wherein the additive is the polyimide having the structure a.

5. The composition of claim 4, wherein R is

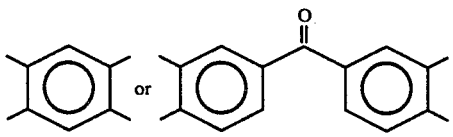

R$^1$ is

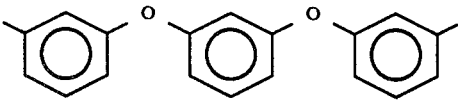

m is 0–1; and n is 0.

6. The composition of claim 1, wherein the additive is the polyisoimide having the structure b.

7. A process for providing a seal between adjacent surfaces, the seal having improved thermal properties, comprising applying the composition of claim 1 to either of the surfaces, placing the surfaces in abutting relationship, and applying sufficient heat to the composition to initiate cure.

* * * * *